May 17, 1955

C. E. TACK ET AL 2,708,491

ARTICULATED BRAKE SUPPORT

Filed April 15, 1950

INVENTORS.
Carl E. Tack
William J. Casey III
BY
Atty.

May 17, 1955 C. E. TACK ET AL 2,708,491
ARTICULATED BRAKE SUPPORT
Filed April 15, 1950 3 Sheets-Sheet 2

INVENTORS.
Carl E. Tack
William J. Casey III
BY Orin O. B. Garner
Atty

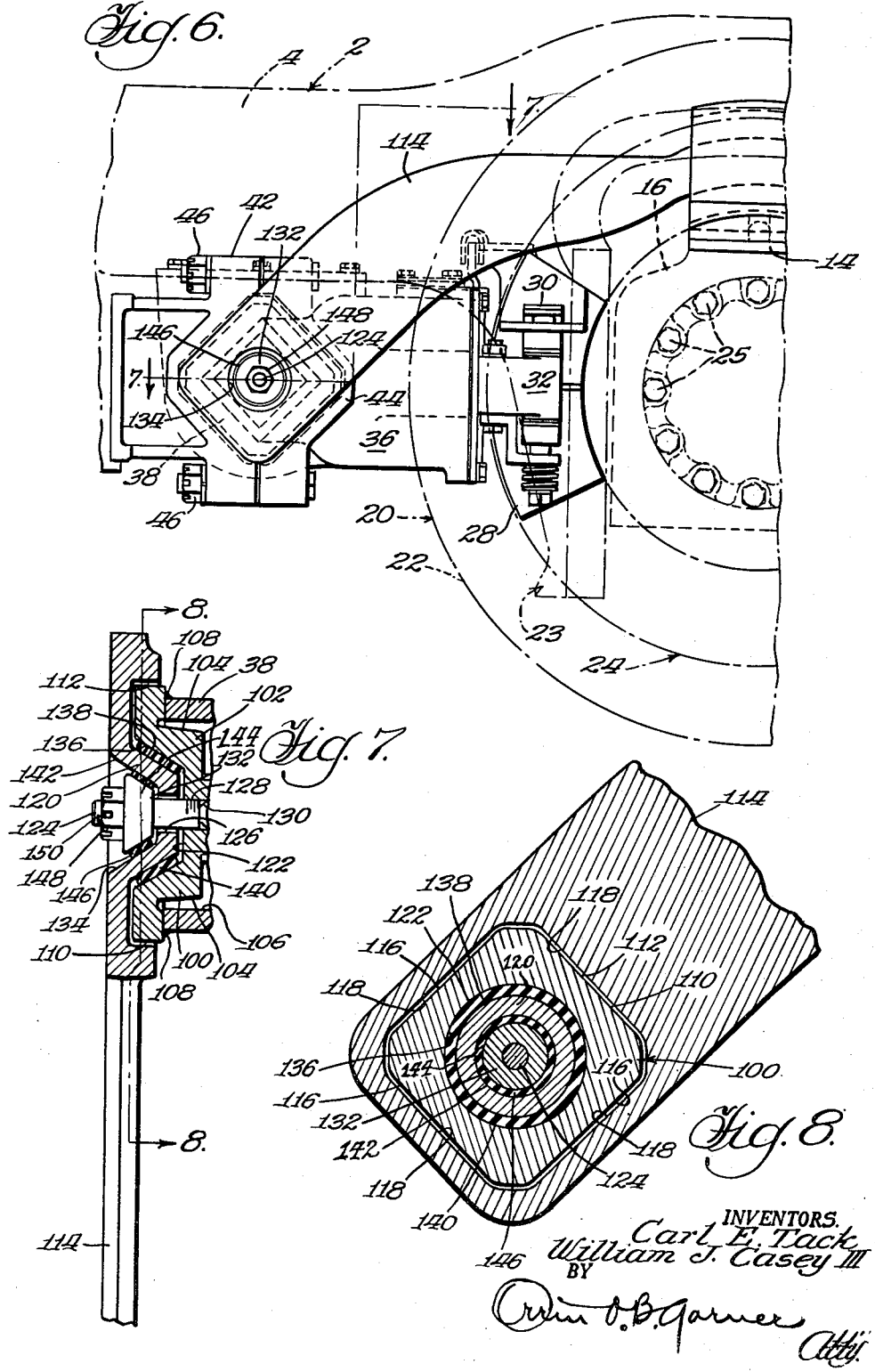

United States Patent Office 2,708,491
Patented May 17, 1955

2,708,491

ARTICULATED BRAKE SUPPORT

Carl E. Tack, Chicago, and William J. Casey III, Highland Park, Ill., assignors to American Steel Foundries, Chicago, Ill., a corporation of New Jersey Application April 15, 1950, Serial No. 156,125

6 Claims. (Cl. 188—59)

This invention relates to brakes and more particularly to railway car truck brakes wherein the friction shoes are carried by a structure supported partly by unsprung portions of the truck and partly by sprung portions of the truck, the shoes being adapted for frictional engagement with brake surfaces rotatable with a wheel and axle assembly of the truck.

In brake arrangements of the above-described type, it has frequently been found advisable to mount the brake shoe supporting structure at points spaced longitudinally of the truck, one point being in the region of the wheel and axle assembly and being characterized by a connection to an unsprung portion of the truck, whereby as the other point, constituting a connection to a sprung portion of the truck, moves upwardly and downwardly, the brake shoes are maintained in substantial alignment with the related brake surfaces. One very serious disadvantge of this arrangement, however, is the fact that relative movement between sprung and unsprung portions of the truck laterally thereof occasionally causes failure of the brake shoe support. Consequently, frequent inspection and expensive maintenance are required. Various efforts have been made to correct this difficulty by providing resilient connections between the brake shoe support and the sprung and unsprung portions of the truck; however, it has been found that such connections, if sufficiently strong to withstand the rigors of railway service, fail to correct the undesirable stressing of the brake shoe support.

Accordingly, a primary object of the present invention is to devise a brake shoe support such as above-described wherein the sprung and unsprung portions of the truck are permitted relative lateral movement without imposing substantial mechanical stresses on the support.

One embodiment of the invention contemplates a multi-part brake shoe support having at least one part thereof connected to an unsprung portion of the truck such as, for example, the wheel and axle assembly, and having another part thereof connected to a sprung portion of the truck, said parts being pivotally connected on a substantially vertical axis accommodating relative lateral movement between the sprung and unsprung portions of the truck.

A further object of the invention is to devise a pivotal connection between the brake support parts comprising resilient means for cushioning relative movement between the parts longitudinally of the truck.

A further object of the invention is to devise a brake shoe support, parts of which may be readily connected and disconnected during assembly and disassembly of the truck.

A further object of the invention is to provide an articulated connection between the brake support and the torque arm, the connection comprising resilient means yieldingly accommodating relative movements between the parts to compensate for relative movements between the sprung and unsprung truck parts thereby preventing overstressing of the connection.

The foregoing and other objects and advantages of the invention will be apparent from a consideration of the following specification and the accompanying drawings wherein:

Figure 6 is a fragmentary side elevational view of a truck embodying a modified form of the invention, the view being comparable to that shown in Figure 2;

Figure 7 is a fragmentary sectional view taken substantially on the line 7—7 of Figure 6; and Figure 8 is a fragmentary longitudinal vertical sectional view taken substantially on the line 8—8 of Figure 7.

Figure 1:
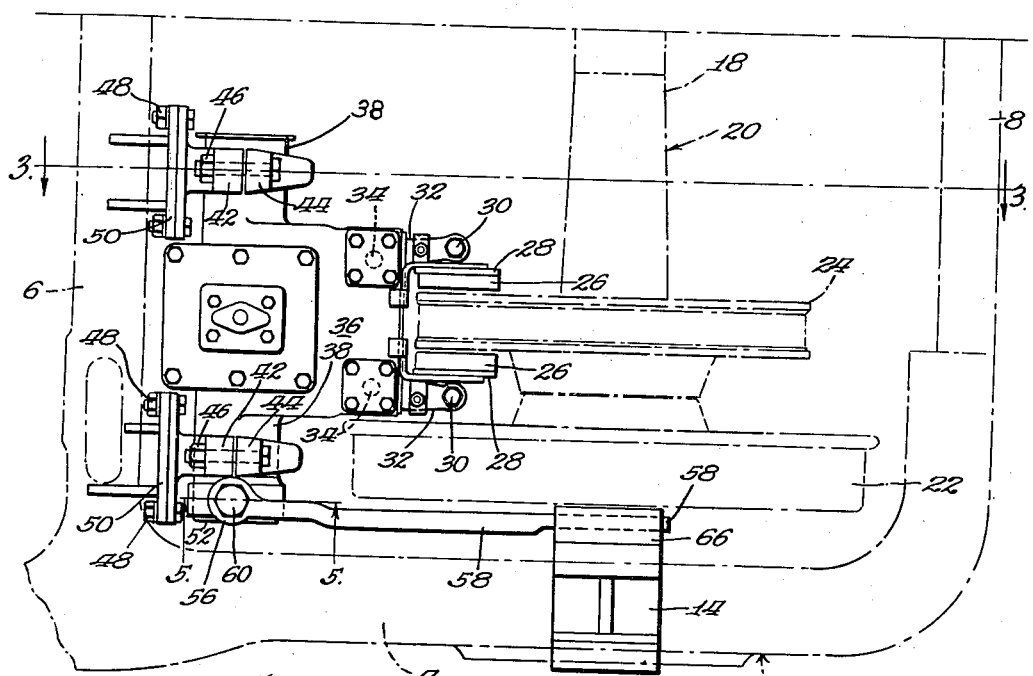
Figure 1 is a fragmentary top plan view of a railway car truck embodying one form of the invention, conventional truck structure being shown in dot and dash lines to clarify the invention.
Figure 2:
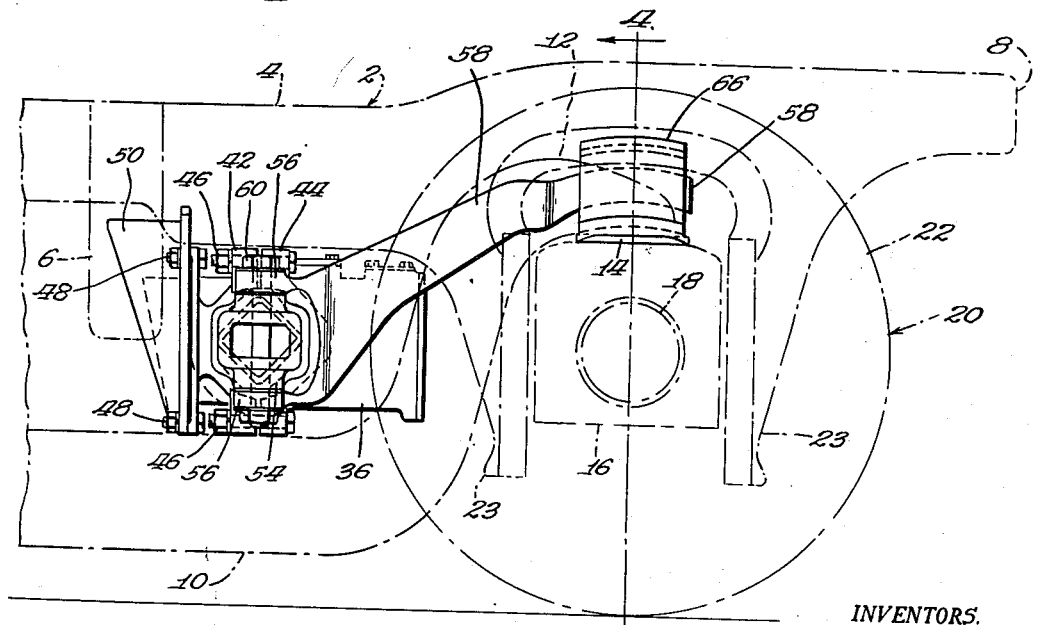
Figure 2 is a side elevational view of the structure shown in Figure 1.

In each of said figures, certain details may be omitted where more clearly seen in other views.

Describing the invention in detail, the railway car truck is of conventional design comprising a truck frame 2 having a side rail 4 extending longitudinally of the truck and having a transom 6 and an end rail 8 extending transversely of the truck. The truck frame is afforded support in the usual manner by springs (not shown) mounted on an equalizer 10 having each end 12 thereof supported on a seat 14 mounted on top of a journal box 16, supported in the usual manner by an axle 18 of a wheel and axle assembly 20 comprising a wheel 22 at each end thereof, and a brake rotor 24 secured as by studs 25 (Figure 3) to each wheel for rotation therewith. The journal box 16 is confined between spaced pedestal legs or jaws 23 depending from the side rail 4, and adapted to guide the frame 2, which, as above noted, is a sprung part, in vertical movement relative to the journal box 16, which is an unsprung part, as will be readily apparent to those skilled in the art. It may be noted that only one-quarter of the truck is shown in the drawings inasmuch as it is symmetrical about its transverse and longitudinal center lines.

Brake means are provided for the brake disk or rotor 24, said brake means being characterized by a pair of friction shoes 26 secured in any convenient manner to brake heads 28 which are pivotally connected as at 30 to brake levers 32, having pivotal connections at 34 within a cylinder housing 36. The housing 36 contains a conventional cylinder and pistons (not shown) operatively connected to the levers 32 for actuation thereof to clamp the shoes 26 against the opposite sides of the rotor 24 during actuation of the brake.

Figure 3:
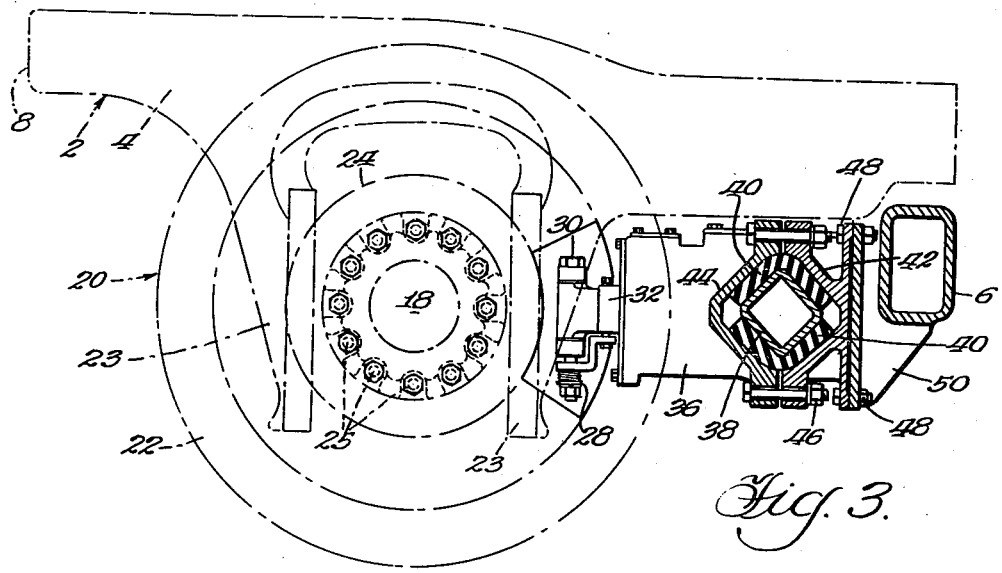
Figure 3 is a sectional view on the line 3—3 of Figure 1.
Figure 4:
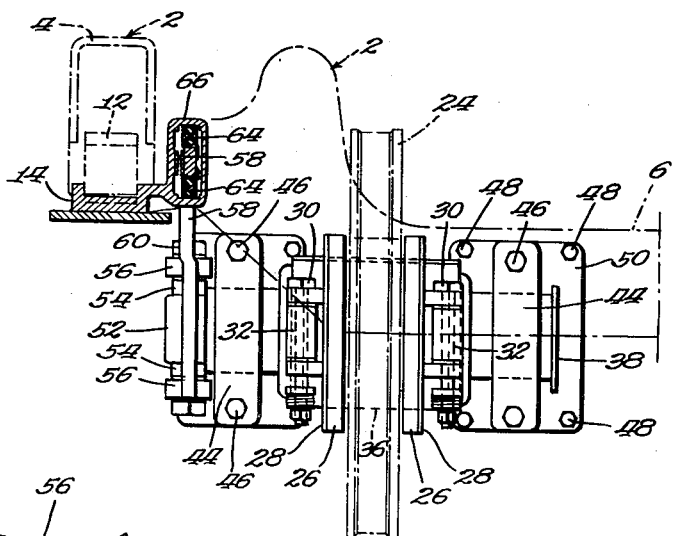
Figure 4 is a sectional view on the line 4—4 of Figure 2.
Figure 5:
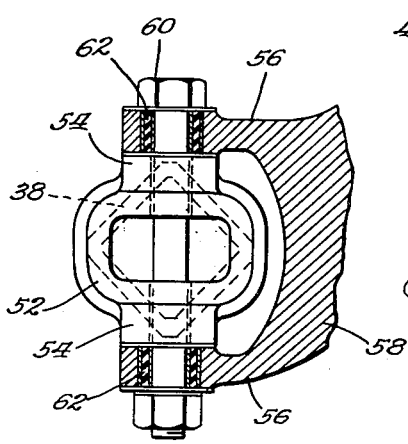
Figure 5 is a sectional view on the line 5—5 of Figure 1.

The inboard and outboard sides of the housing 36 are provided with lugs or extensions 38, which as best seen in the sectional views of Figures 3 and 5, are preferably in the form of hollow, rectangular members having opposite corners thereof projecting upwardly and downwardly. Each lug 38 is confined between a pair of spaced top and bottom resilient pads 40 clamped between a bracket 42 and a cover plate or clamping piece 44 secured to the bracket 42 as by top and bottom, bolt and nut assemblies 46. Each bracket 42 is secured as by bolt and nut assemblies 48 to a support 50 mounted in any convenient manner, as by welding, on the transom 6.

The outboard lug 38 is provided at its outboard end with a flat, hollow pad or extension 52 having top and bottom bosses or bearings 54 disposed between top and bottom jaws 56 of a brake support part or torque arm 58. The jaws 56 are pivotally connected to the pad 52 and bosses 54 by a bolt and nut assembly 60 which is resiliently bushed as at 62 in the jaws 56. The torque arm 58 extends upwardly from its pivotal connection at 60 and is confined at its opposite end between top and bottom resilient pads 64 clamped within a jaw 66 carried by the equalizer seat 14 which, as before noted, is supported by the unsprung journal box 16.

Thus, it will be noted that one end of the torque arm 58 is supported by an unsprung part 16 of the truck in the region of the wheel and axle assembly 20, and the torque arm extends longitudinally of the truck from said connection to its pivotal connection at 60 on a substantially vertical axis to the pad or extension 52 of the outboard lug 38, which, as above noted, is a part of the cylinder housing 36. Inasmuch as the cylinder housing 36 is supported by its lugs 38 from the transom 6 of the sprung truck frame 2 which, as is well known to those skilled in the art, supports the weight of a superposed car body (not shown), it will be seen that the wheel and axle assembly 20 and truck frame 2 are afforded relative movement lengthwise of the wheel and axle assembly 20, or in other words, transversely of the truck without stressing the torque arm 58, inasmuch as such movement between the wheel and axle assembly 20 and the frame 2 is accommodated by the pivotal connection at 60.

Relative movement of the truck frame 2 and wheel and axle assembly 20 longitudinally of the truck is accommodated by the resilient bushings 62 without stressing the bolt and nut assembly 60. It may also be noted that upon application of the brake shoes 26 to the rotor 24, brake torque is transmitted from the levers 32 to the cylinder housing 36 and thence to the torque arm 58, and for this reason, the bosses 54 are preferably afforded a snug seat between the jaws 56 to provide for transmission of torque from the pad 52 to the torque arm 58 without substantial rotational movement of the pad 52 between the jaws 56. However, if desired, the bosses 54 may be spaced from the jaws 56 to afford a universal connection between each pad 52 and the related torque arm 58.

It may be noted that, if desired, one or the other of the resilient connections 40, 42, 44 between the cylinder housing 36 and the transom 6 may be eliminated and, if desired, the inboard lug 38 may be connected to the corresponding inboard lug 38 of the cylinder housing 36 at the opposite side of the truck, an arrangement which is conventional in the prior art.

Referring now to the modification shown in Figures 6 to 8, the parts identical with those shown in the previous modifications are identified by corresponding reference numerals. In the present embodiment, the outboard lug 38 has an adapter or cap 100 positioned at its outboard end, the cap comprising a boss 102, which extends into the lug 38 in complementary fit therewith. The corners of the boss 102 are cut away or beveled as at 104 to insure fitting of the boss 102 into the opening 106 in the hollow lug 38. The cap is secured in any convenient manner to the lug 38, preferably as by welding at 108. The cap comprises a non-round outer periphery 110 and is preferably substantially square in cross section as readily seen in Figure 8. The cap 100 fits loosely within a complementary cavity 112 at one end of a torque arm 114, the other end of which is connected to the bracket 14. The torque arm and the brake support structure, of which the lug 38 is a part, are thus accommodated relative rotational movement on a substantially horizontal axis, extending transversely of the truck. This movement is limited through abutment of adjacent sides 116 and 118 on the periphery of cap 100 and opening 112, respectively.

The connection comprises a frusto-conical hollow boss 120 on the arm 114 centrally of the cavity 112. The boss 120 extends into a frusto-conical opening 122 in the external side of the boss 102 of the cap 100. The arm 114 is articulately or flexibly connected to the lug 38 by means of a stud 124 which extends loosely through an opening 126 in the boss 120 and is threaded as at 128 to the boss 102. The stud 124 may be fixed to the boss 102 as by welding at 130. The stud 124 carries a cone 132 adjacent at its outer end, the cone fitting within a frusto-conical opening 134 in the external side of the boss 120.

It will be noted that the boss 102 presents a frusto-conical surface 136 on its external side and that the boss 120 presents an opposed complementary frusto-conical surface 138 on its internal side. The surfaces 136 and 138 are engaged by a frusto-conical resilient bushing 140 which is compressed between the surfaces 136 and 138. It will be noted that the bushing 140 is spaced at its inner and outer edges from the inner and outer ends of opening 122 in order to accommodate flow of the material constituting the bushing 140, said material being rubber or any other well known resilient composition.

Similarly, the boss 120 presents on its external side withcone 132 presents a complementary opposed frusto-conical surface 144 which is spaced from surface 142. The surfaces 142 and 144 receive therebetween a frusto-conical resilient bushing 146 such as rubber, the bushing 146 being compressed between and engaging surfaces 142 and 144. It will be noted, as readily seen in Figure 7, that the stud 124 is provided with a nut 148 outboardly of the cone 132, the nut being adapted to adjust the compression of the bushings 140 and 146 by rotation on the end of the stud 144. The nut 148 is preferably provided with castellations through which may extend a cotter key, not shown, the key also extending through a suitable opening 150 in the stud as will be readily understood by those skilled in the art. It will be readily noted that the connection between the arm 114 and the lug 38 is flexible laterally or transversely of the truck. The provision of frusto-conical bushings engaged between complementary surfaces on the brake support and the torque arm tends not only to center the parts but also provides efficient utilization of the resilient means. It will be noted that the bushings 140 and 146 will be stressed in shear during relative rotational movement between the arm 114 and the lug 38 and that these bushings will be stressed primarily in compression during relative lateral movement between these parts.

We claim:

1. In a brake arrangement for a railway car truck, a wheel and axle assembly, a frame sprung therefrom, a brake support mounted on the frame and having an extension extending generally parallel to the axle of said assembly, a torque arm arranged angularly to said extension and supported on said assembly at one end and having a pocket at the other end with a frusto-conical boss therein, said extension having angular sides and said pocket having complementary sides slightly spaced from the respective sides of said extension whereby said arm has limited movement with respect to said support, and a connection between the arm and extension comprising a cap on the outer end of the extension with a frusto-conical recess receiving said boss at one end, said boss having a frusto-conical cavity in its other end, a stud passing through a loose opening in said boss and connected to said cap, a cone mounted on the stud and extending into said cavity, frusto-conical resilient bushings between the concentric adjacent sides of said boss and said recess and between the concentric adjacent sides of the cone and said cavity, and adjustable means on said stud for tightening said connection to adjust the compression of said bushings.

2. In a brake arrangement for a railway car truck comprising a wheel and axle assembly and a truck frame spring-supported thereby; the combination of a brake support having inboard and outboard lugs, means resiliently and movably connecting said lugs to the frame, a torque arm resiliently connected to the assembly, brake means carried by the support for decelerating rotation of said assembly, and means for universally connecting the support and torque arm at the outboard extremity of said outboard lug, said last mentioned means comprising a cap on the end of the outboard lug received within an aperture on the torque arm, a pivotal connection between the cap and arm accommodating both vertical and horizontal rotative movements between the arm and the outboard lug, and abutment means on the cap to engage the periphery of the aperture to positively limit vertical rotative movement between the arm and the outboard lug, whereby upon movement of said assembly relative to said frame, the arm and support are afforded pivotal movement therebetween at the point of pivotal connection.

3. In a brake arrangement for a railway car truck having a wheel and axle assembly and a truck frame spring-supported thereby; the combination of a brake support carrying brake means for decelerating said assembly, means spaced lengthwise of the truck from said brake means and movably connecting said support to the frame, a torque arm extending entirely lengthwise of the truck from said support, said arm having one end thereof supported by the assembly, and a pivotal connection between the other end of the arm and the outboard extremity of the support for accommodating relative movement therebetween on a substantially vertical axis, said pivotal connection comprising a conical boss on the arm received within a conical cavity formed in the outboard extremity of the support, a pivot pin interconnecting the arm and support in the area of the cones, and engageable abutment means on the arm and support, respectively, operative to limit pivotal movement about said pin by the arm and the support.

4. In a brake arrangement for a railway car truck, a sprung part including a truck frame, an unsprung part including a wheel and axle assembly, brake means for the assembly comprising a brake support pivotally connected to the frame and having an outboard lug member extending transversely of the frame, a torque arm member extending entirely longitudinally of the frame and having one of its ends connected to the assembly for movement therewith, one of said members partially embracing the other by receiving an upstanding boss on said other member within a complementally formed cavity on said one member, a horizontal bolt pivotally interconnecting said members, said pivotal connection occurring at the end opposite the mentioned end of the torque arm member and accommodating substantial pivotal movement between said members transversely of the truck, resilient means compressed axially of said bolt between said members and oriented to yieldably resist said movement between said members, and abutment means comprising surfaces on one of said members received within an aperture of said members and engageable to substantially restrict relative pivotal movement between said members in a vertical direction.

5. In a brake arrangement for a railway car truck, an unsprung part including a wheel and axle assembly, a sprung part including a truck frame, a brake support extending transversely of the truck, brake means carried by said support for decelerating rotation of said assembly, a torque arm extending entirely longitudinally of the truck and connected at one end to one end of the wheel and axle assembly, and a pivotal coupling between the other end of said arm and support, said coupling comprising a cavity in the torque arm, a cap on the end of the support received within said cavity, said cap and cavity being complementally arranged and of non-round formation, a pivot pin interconnecting the arm and the support, resilient pads interposed between the arm and the support and surrounding the pivot pin, said surfaces being engageable with the periphery of the receiving cavity to positively restrict relative pivotal movement between the arm and the support in a substantially vertical direction.

6. In a brake arrangement for a railway car truck having a wheel and axle assembly and a truck structure spring-supported thereby; the combination of a brake support member, means pivotally connecting said member to said structure, a torque member having one of its ends connected to said assembly, a brake rotor connected to said assembly for rotation therewith, brake means mounted on said support member for clamping said rotor, and a pivotal connection between the end opposite the mentioned end of said torque member and the outboard extremity of said support member accommodating relative movement between said assembly and said structure transversely of the truck when said brake means are released, said connection comprising means for transmitting torque from the support member to the torque member whereby said torque is transmitted by the torque member to said assembly, said last mentioned means comprising abutments on the extremities of the support member which are received intermediate abutments formed on the torque member, all of said abutments being engageable to positively limit relative vertical movements between the torque member and the support member.

References Cited in the file of this patent

UNITED STATES PATENTS

| | | |
|---|---|---|
| 2,355,120 | Tack | Aug. 8, 1944 |
| 2,377,190 | Tack | May 29, 1945 |
| 2,402,489 | Eksergian | June 18, 1946 |
| 2,436,136 | Baselt | Feb. 17, 1948 |
| 2,438,482 | Tack | Mar. 23, 1948 |
| 2,467,356 | Eksergian | Apr. 12, 1949 |
| 2,655,226 | Tack et al. | Oct. 13, 1953 |
| 2,661,818 | Tack | Dec. 8, 1953 |